US007432847B2

(12) United States Patent
Fedotov et al.

(10) Patent No.: US 7,432,847 B2
(45) Date of Patent: Oct. 7, 2008

(54) ULTRA-WIDEBAND TRANSCEIVER

(75) Inventors: Dmitry Fedotov, Moscow (RU); Alexander Sudakov, Moscow (RU)

(73) Assignee: Wireless 2000 RF & UWB Technologies Ltd., Burnaby, Bristish Columbia (CA)

( * ) Notice: Subject to any disclaimer, the term of this patent is extended or adjusted under 35 U.S.C. 154(b) by 84 days.

(21) Appl. No.: 11/143,315

(22) Filed: Jun. 2, 2005

(65) Prior Publication Data

US 2005/0270221 A1 Dec. 8, 2005

Related U.S. Application Data

(60) Provisional application No. 60/576,796, filed on Jun. 3, 2004.

(51) Int. Cl.
*G01S 13/00* (2006.01)
*H03D 1/00* (2006.01)

(52) U.S. Cl. ............................ 342/28; 342/73; 375/343

(58) Field of Classification Search ................ 342/347, 342/73

See application file for complete search history.

(56) References Cited

U.S. PATENT DOCUMENTS

| | | | | |
|---|---|---|---|---|
| 4,791,380 | A * | 12/1988 | Chiappetta | 329/352 |
| 5,345,471 | A | 9/1994 | McEwan | |
| 5,361,070 | A | 11/1994 | McEwan | |
| 5,523,760 | A | 6/1996 | McEwan | |
| 5,973,318 | A | 10/1999 | Plesko | |
| 6,206,340 | B1 | 3/2001 | Paese et al. | |
| 6,239,741 | B1 * | 5/2001 | Fontana et al. | 342/135 |
| 6,351,246 | B1 | 2/2002 | McCorkle | |
| 6,388,609 | B2 | 5/2002 | Paese et al. | |
| 6,426,716 | B1 | 7/2002 | McEwan | |
| 6,512,474 | B2 | 1/2003 | Pergande | |
| 6,568,655 | B2 | 5/2003 | Paese et al. | |
| 6,690,741 | B1 | 2/2004 | Larrick, Jr. et al. | |
| 2001/0009404 | A1 | 7/2001 | Paese et al. | |
| 2002/0130809 | A1 | 9/2002 | Kim | |
| 2002/0171056 | A1 | 11/2002 | Paese et al. | |
| 2004/0021599 | A1 * | 2/2004 | Hall et al. | 342/28 |

(Continued)

FOREIGN PATENT DOCUMENTS

| | | |
|---|---|---|
| JP | 2256316 | 10/1990 |

OTHER PUBLICATIONS

Wireless 2000, http://wireless200.com/switch.htm, 1997-2004, 1 page.

(Continued)

*Primary Examiner*—Thomas H. Tarcza
*Assistant Examiner*—Harry Liu
(74) *Attorney, Agent, or Firm*—Oyen Wiggs Green & Mutala, LLP

(57) ABSTRACT

An ultra-wideband transceiver that includes a selection mechanism for selecting an internal or an external pulse repetition frequency generator, the output of which is used in the generation of very short duration UWB RF pulses. A detection mechanism is electrically isolated from the oscillator but shares access to a single port that is used for both transmission and reception (e.g. a physical layer transmit/receiver port) of RF signals. The detection mechanism detects changes in the received signal by comparing the received signal to a reference, amplifying these changes, removing high frequency noise and sending the resulting signal for subsequent signal processing, for example a digital signal processing system.

15 Claims, 4 Drawing Sheets

U.S. PATENT DOCUMENTS

2004/0022304 A1 2/2004 Santhoff et al.

OTHER PUBLICATIONS

Chris Wang, Contactless switch from AgilSense, New Products Galore, http://www.stee.st.com.sq/publication/Vol16No3/Agilsense.pdf, 1 page.

Bruce Watkins, San Diego Telecom Council, Introduction to Ultra Wideband, pp. 1-22, SDTelecom 101: Intro to UWB.

Ultra Wide-Band to Global Positioning System Potential Interference Scenarios, http://www.ntia.doc.gov/osmhome/uwbtestplan/mtg090700 files/scenario.htm, 3 pages.

* cited by examiner

ULTRA-WIDEBAND TRANSCEIVER

CROSS-REFERENCE TO RELATED APPLICATIONS

This application claims the benefit of U.S. Provisional Application No. 60/576,796 filed Jun. 3, 2004 entitled "Ultra-Wideband Transceiver".

FIELD OF THE INVENTION

The present invention relates generally to electrical signal transmission and reception, and more particularly to ultra-wideband transceivers.

BACKGROUND OF THE INVENTION

Ultra-wideband (UWB) technology has a wide range of applications. For example, UWB can be used to transmit digital data over a wide frequency spectrum with low power. UWB devices can be used for precise measurement of distances or locations of objects and for obtaining the images of objects buried under ground or behind surfaces. UWB devices can also be used for wireless communications, particularly for short-range high-speed data transmissions. UWB devices can also be used in motion detection systems such as contactless switches, intrusion detection systems, and the like.

An ultra-wideband (UWB) transmitter is an intentional radiator that, at any point in time, has a fractional bandwidth equal to or greater than 0.20 or has a UWB bandwidth equal to or greater than 500 MHz, regardless of the fractional bandwidth. UWB radios, for example, communicate with short pulses or cycles in the order of a nanosecond, spreading their energy over a wide swath of bandwidth, as opposed to modulated sinusoids whose energy is localized around a single frequency.

Typical UWB devices such as motion sensors use separate transmit and receive ports (antennae) and employ the use of matching impulse/step generators in a detection circuit, which generally increases the cost and complexity of the device.

Therefore, there is a need for a UWB transceiver that can be deployed for at least the application examples discussed above in a more cost effective and less complex manner,

SUMMARY OF THE INVENTION

In accordance with an exemplary embodiment of the present invention, the ultra-wideband transceiver includes: a selection mechanism (e.g., a jumper) for selecting an internal or an external oscillator (e.g., a PRF generator module), the output of which is used by an impulse generator to produce very short duration pulses. A detection mechanism (e.g., a diode detector module, in-part) is electrically isolated from the oscillator but shares access to a single port that is used for both transmission and reception (e.g., a physical layer transmit/receive port) of RF signals. The detection mechanism detects changes in the received signal by comparing the received signal to a reference (by using a thermal compensation for example), amplifying these changes (by using a differential amplifier module for example), removing high frequency noise (by using a base band filter module for example) and sending the resultant signal for subsequent signal processing (to a digital signal processing system for example).

In accordance with one aspect of the present invention there is provided an ultra-wideband (UWB) transceiver for detecting motion of an object comprising a generator mechanism for generating a UWB radio frequency (RF) signal of short duration pulses; a port mechanism coupled to the generator mechanism, operable in a transmit mode for transmitting the generated UWB RF signal and a receive mode for receiving an UWB RF signal; and a detector mechanism coupled to the port mechanism for detecting changes of the received UWB RF signal relative to a thermal compensation reference signal; wherein the received UWB RF signal relative to the thermal compensation reference signal varies with motion of the object.

In accordance with another aspect of the present invention there is provided an ultra-wideband (UWB) transceiver for detecting motion of an object comprising a pulse repetition frequency (PRF) generator for generating an UWB RF signal; an impulse generator coupled to the PRF generator; a physical layer transmit/receive (T/R) port coupled to the impulse generator operable between a transmit mode for transmitting the UWB RF signal or a receive mode for receiving a reflected UWB RF signal from the object; a diode detector coupled to the T/R port for receiving a signal from the T/R port and determining an energy average output of the received UWB RF signals over a defined period of time; a thermal compensator for generating a thermal compensation reference signal based upon variations in direct current (DC) supply voltage from ambient temperature fluctuations; a differential amplifier for processing the energy average output from the diode detector and using the thermal compensation reference signal to generate an amplified differential signal having a high frequency noise component; and a baseband filter for removing the high frequency noise component from the amplified differential signal for generating a baseband signal; wherein motion of the object can be identified by changes in the baseband signal over the defined period of time.

In accordance with another aspect of the present invention there is provided a method of detecting the motion of an object comprising transmitting a short duration ultra-wideband (UWB) radio frequency (RF) signal through a transmit/receive port; receiving a reflected UWB RF signal from an object through the transmit/receive port; alternating between transmitting and detecting through the transmit/receive port in a half-duplex manner; comparing the received UWB RF signal to a thermal compensation reference signal; generating a differential signal between the received UWB RF signal and the thermal compensation reference signal; amplifying and filtering the differential signal to produce a baseband low frequency signal; and processing the baseband low frequency signal to determine motion of the object.

DETAILED DESCRIPTION OF EMBODIMENTS OF THE PRESENT INVENTION

Figure 1:
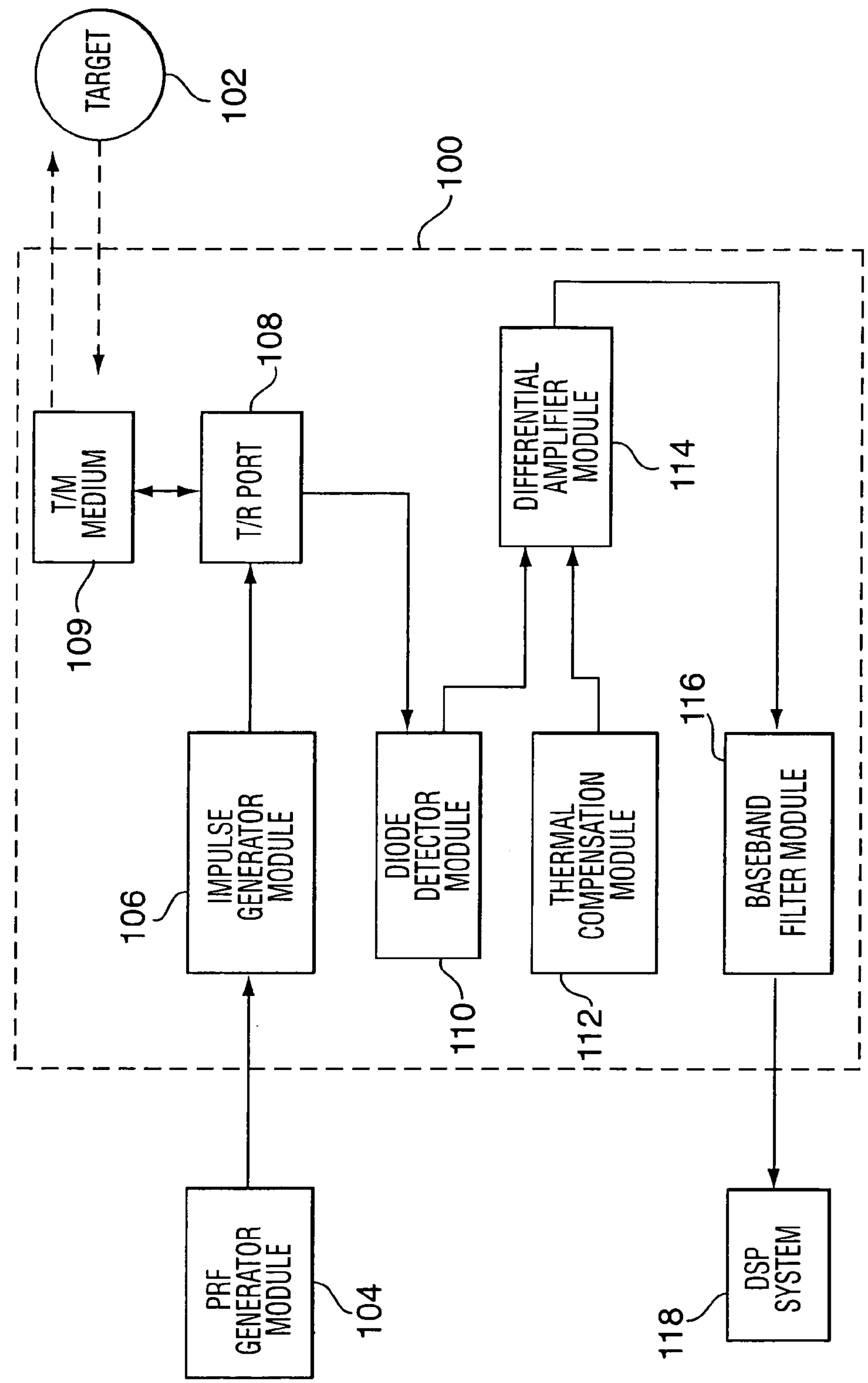
FIG. 1 illustrates a block diagram representation of an ultra-wideband transceiver according to an embodiment of the present invention.

FIG. 1 illustrates a block diagram representation of an ultra-wideband (UWB) transceiver 100 according to an embodiment of the present invention. The UWB transceiver 100 can interact with a target 102 in a motion sensor application based example.

A pulse repetition frequency (PRF) generator module 104 triggers an impulse generator module 106 to generate very short duration pulses typically less than a nanosecond in width occurring with a frequency between 1 and 30 MHz, for example. The PRF generator module 104 can be located externally (as shown) and/or internally to the UWB transceiver 100. Handling internally and/or externally generated PRF signals is described in conjunction with FIGS. 2 and 3.

The impulse generator module 106 differentiates an input waveform coming from the PRF generator 104. In an exemplary embodiment, a square wave of period T, input to the impulse generator module 106 is differentiated to produce an output pulse train of positive and negative pulses with period T.

The UWB transceiver 100 includes a physical layer transmit/receive (T/R) port 108. The T/R port 108 has a dual role: transmission and reception. In a transmit mode, the T/R port 108 acts as a transmit port transmitting an UWB RF signal comprising pulses generated by the impulse generator module 106 to an attached physical layer transmission/reception (T/R) medium 109 (such as an antenna, coaxial cable, twisted pair, etc.). In a receive mode, the T/R port 108 acts as a receive port receiving pulses from the T/R medium 109 and sending the received pulses to a diode detector module 110 for processing. Switching between transmit and receive modes (in the T/R port 108), to enable duplex operation, is controlled by the impulse generator module 106. For example, when a pulse (generated by the impulse generator module 106) is presented to the T/R port 108 it is placed into transmit mode, otherwise it is in receive mode.

The diode detector module 110 receives an input signal (i.e., a received signal from the target 102) from the T/R port 108 and averages the energy in the received signal over time. A thermal compensation module 112 acts as a baseline (i.e., a reference) against which the received signal is compared. The thermal compensation module 112 allows variations in the supply voltage due to fluctuations in ambient temperature to be accommodated. The thermal compensation module 112 is similar in circuitry (detailed in conjunction with FIGS. 2 and 3) to the diode detector module 110 but has a static (i.e., non-time varying) input signal.

A differential amplifier module 114 compares output from the diode detector module 110 (input 1 to module 114) to output from the thermal compensation module 112 (input 2 to module 114) and amplifies a difference between the two inputs (input 1 and input 2) to generate a difference signal. A baseband filter module 116 receives the difference signal from the differential amplifier module 114 and removes high frequency noise components leaving only low frequency components, which identify changes in the received signal (i.e., the received pulse stream from the T/R port 108). Output from the baseband filter module 116 can be sent to a digital signal processing (DSP) system 118 or other equipment for subsequent processing.

In summary, the UWB transceiver 100 emits a pulse train in transmit mode and switches to receive mode in which an incoming pulse stream is averaged and differentiated. Therefore, the UWB transceiver 100 operates in receive mode at all times except during pulse transmission. The UWB transceiver 100 uses a single port (T/R port 108) for both transmit and receive modes.

Figure 2:
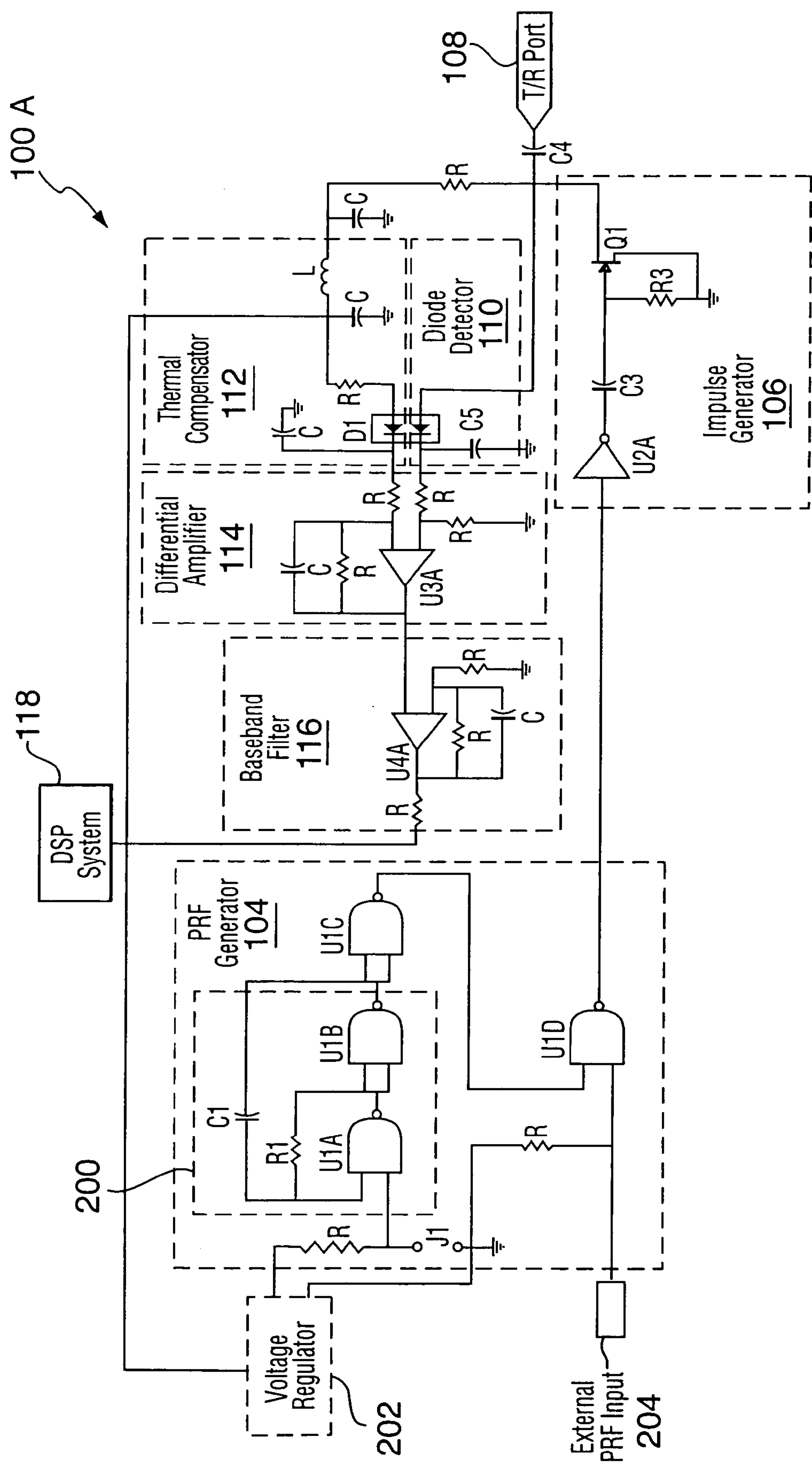
FIG. 2 illustrates a schematic circuit representation of the ultra-wideband transceiver of FIG. 1 according to an embodiment of the present invention.
Figure 3:
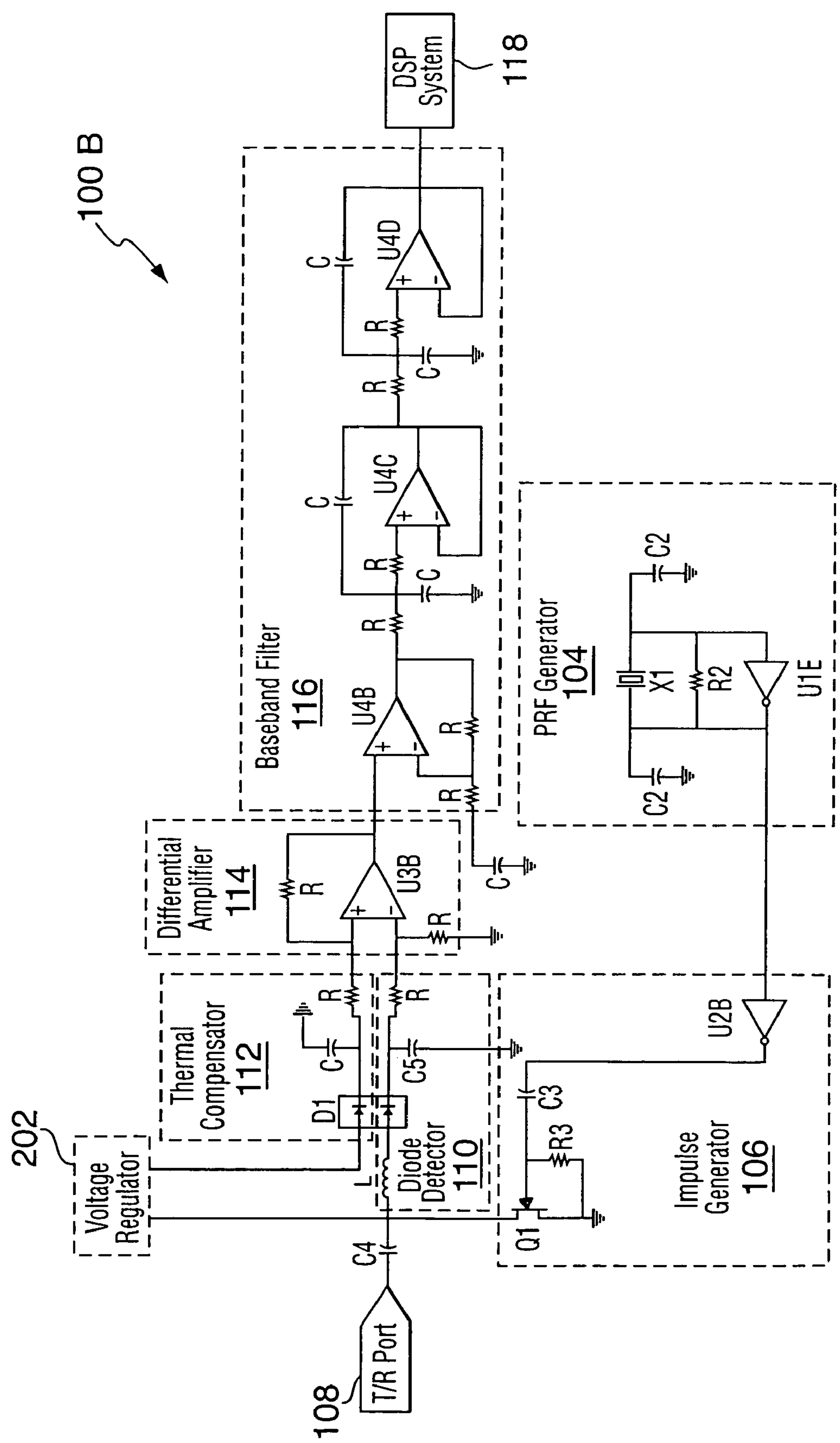
FIG. 3 illustrates a schematic representation of the ultra-wideband transceiver of FIG. 1 according to another embodiment of the present invention.

FIGS. 2 and 3 illustrate schematic circuit representations 100A and 100B, respectively, of the ultra-wideband transceiver 100 of FIG. 1 according to embodiments of the present invention. The two circuit representations 100A and 100B will be described together. Resistors, capacitors and inductors are referenced generically in the drawings as R, C and L respectively. In the accompanying description, specific elements of circuit representations 100A and 100B are referred to individually.

As described above in conjunction with FIG. 1, the PRF generator module 104 generates PRF signals. In FIG. 2, internal PRF signals are generated by an RC multi-vibrator module 200 comprised of resistor R1, capacitor C1, and NAND gates U1A and U1B. In FIG. 3, internal PRF signals are generated by a ceramic oscillator X1 in combination with a resistor R2, capacitors C2, and a high-speed inverter U1E. In FIG. 2, jumper J1 (a selection mechanism) enables selection between internal PRF signal and external PRF signal generation via input 204. In FIG. 2, the NAND gate U1D, connected by NAND gate U1C from the output of the RC multi-vibrator module 200, enables either an internal PRF signal or an external PRF signal to enter the circuit 100A. A signal resulting from the NAND gate U1D (in FIG. 2) and from the output of the inverter U1E (in FIG. 3) will henceforth be referred to as the PRF signal.

The PRF signal then proceeds to the impulse generator module 106. In FIGS. 2 and 3, the PRF signal passes through a fast buffer U2A and U2B respectively to a transistor Q1 (having a base, drain, and a source) to form a short duration pulse. In particular, from the output of the buffer U2A and U2B, the signal proceeds to the base of the transistor Q1 through a differential chain consisting of a capacitor C3 and a resistor R3. The signal that forms on the drain of the transistor Q1 varies based on the choice of C3.

As discussed, in relation to FIG. 1, the receive function of the UWB transceiver 100 is based on video frequency impulse detection and thermal compensation. In FIGS. 2 and 3, the diode pair D1 acts as both a detector and a compensator. An upper diode of the diode pair D1 is part of the thermal compensation module 112 and a lower diode of the diode pair D1 is part of the diode detector module 110. With the gate of transistor Q1 open (i.e. when the transceiver 100A/B is in receive mode), the diode pair D1 is displaced due to a voltage applied on the drain of both diodes (e.g. to +5V with a current of 3.5-5 mA). When the gate of transistor Q1 closes (i.e. when the transceiver 100A/B is in transmit mode), the lower D1 diode becomes reverse biased and will not conduct unless a voltage in excess of the reverse bias voltage is applied to the anode of the diode.

In transmit mode, the input to the detector (the voltage differential between the pair of diodes D1) is held constant and, since the detection is based on rate of change of the voltage differential between the pair of diodes, no detection occurs. In receive mode, the gate of transistor Q1 is open and the lower D1 diode is no longer reverse biased.

Signals from the T/R port 108 that pass through a capacitor C4 and an antenna-matching element, which contain both positive and negative reflection impulses (and noise) relative to a displacement point of the diode pair D1. The positive reflection impulses together with the displacement voltage create a detection voltage proportional to the power of a radio frequency (RF) signal. The detection voltage charges a capacitor C5 (in the diode detector module 110) and creates a potential difference (voltage differential) between the lower detector diode (in diode pair D1) and the upper detector diode (in diode pair D1), which does not have an RF signal input. The capacitor C5 discharges when no signal is received from the T/R port 108.

The voltage differential between the diode pair D1 is accentuated using amplifier U3A in FIG. 2 and U3B in FIG. 3 (in the differential amplifier module 114) and further amplified and low-pass filtered using amplifiers U4A in FIG. 2 and U4B, U4C and U4D in FIG. 3 (in the baseband filter module 116). In one practical example of the UWB transceiver 100, the amplification out (after both amplifiers U4A and U4B) is approximately 26 dB. Since the amplifiers U4A and U4B are connected without decoupling capacitors, amplification occurs in the frequency range from DC to 8 MHz. The output of baseband amplifier 116, is provided at port 118 to the DSP system for further processing.

A voltage regulator 202 that provides power to the circuit 10A/B is well known in the art and enables operation from +7V to +12V, for example.

Figure 4:
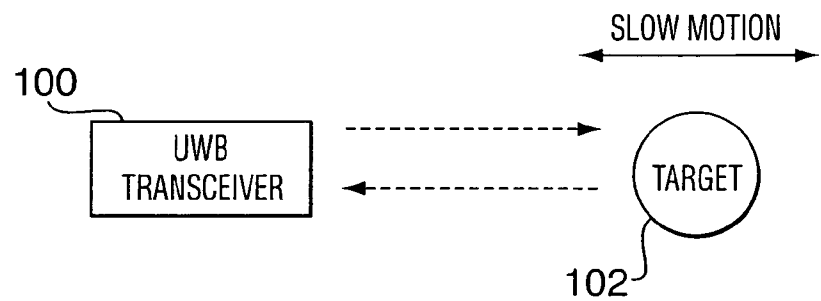
FIG. 4 illustrates a block diagram representation of a low frequency motion detection application for the ultra-wideband transceiver of FIG. 2 or 3.

FIG. 4 is a schematic representation to illustrate the use of the UWB transceiver 100 in a motion detection application to detect the motion of the target object 102. When the UWB transceiver 100 is being used as a motion sensor, the transceiver 100 emits a very low duty cycle pulse train that is generated by the PRF generator module 104 and the impulse generator module 106 in transmit mode. The pulse train is reflected off objects (including the target object 102 shown) within its range. In between each pulse, the transceiver 100 operates in receive mode to receive reflected signals (i.e., reflections or an incoming pulse stream).

Since the transceiver 100 uses wideband short pulses (as opposed to longer modulated carrier waves), the transceiver 100 detects reflections almost immediately after transmission of the short pulse. This allows detection of objects at very short ranges from the transceiver 100. The reflections (i.e., the incoming pulse stream) are then averaged by the diode detector module 110 and subsequently differentiated by the differential amplifier module 114. The diode detector module 110 produces a nearly constant output (a static value) when there is no movement in a prescribed detection range (established by signal power etc.) and produces a time varying output (a non-static value) when the object 102 moves. Thus, by differentiating the output from the diode detector module 110, with respect to the thermal compensation module 112, movement of the target object 102 can be detected.

Figure 5:
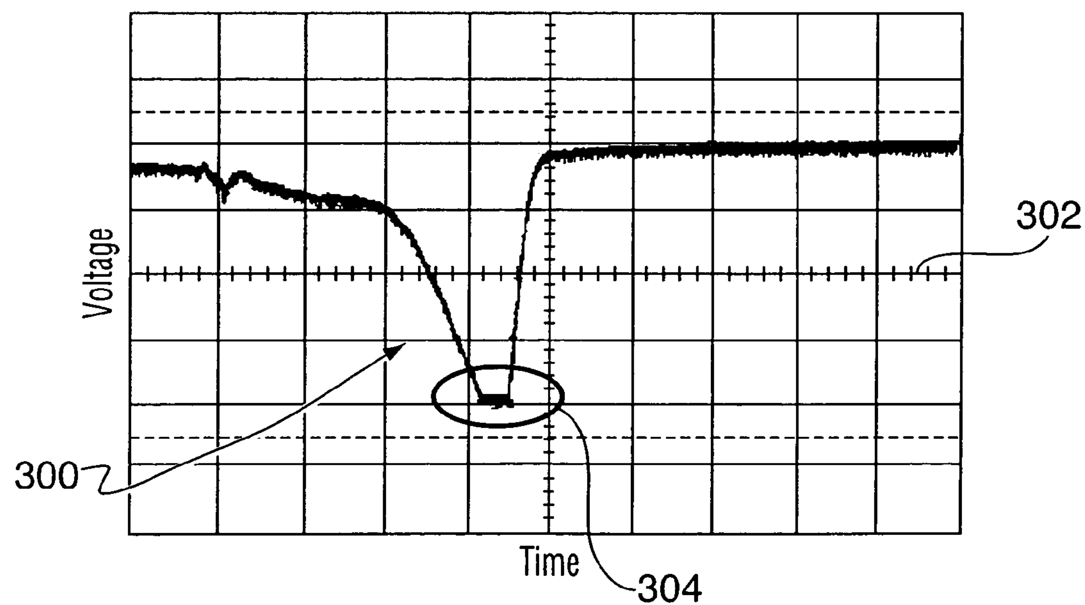
FIG. 5 illustrates a sample of a transmitted pulse from the ultra-wideband transceiver of FIG. 2 or 3.

An example of a typical transmitted pulse signal 300 is provided in FIG. 5. The pulse signal 300 is seen at the input to the physical layer transmit/receive port 108. When the pulse signal 300 is high (above line 302) the transceiver 100 is in receive mode and when the signal is low (around marked area 304) the transceiver 100 is in transmit mode. The pulse signals 300 are repeated at the pulse repetition frequency to form a pulse train.

The UWB transceiver 100, according to the various embodiments of the present invention, can be deployed in a motion sensor based application (one of which is described in conjunction with FIG. 2) and many other applications, such as:

(a) security systems—UWB motion sensors placed behind walls, behind ceilings and below floors;

(b) concealed contactless switches for lights, doors, appliances etc.;

(c) medical applications;

(d) collision sensors; and (e) data communications (e.g., short range wireless).

The invention claimed is:

1. An ultra-wideband (UWB) transceiver for detecting motion of an object comprising:

a. a generator mechanism for generating a UWB radio frequency (RF) signal of short duration pulses and connected to output the generated UWB RF signal to a node;

b. a port mechanism coupled to the node, operable in a half-duplex manner between a transmit mode for transmitting the generated UWB RF signal from the node and a receive mode for receiving an UWB RF signal and providing the received UWB RF signal to the node; and c. a detector mechanism hard-wired to the node for detecting changes of the received UWB RF signal relative to a thermal compensation reference signal, the detector mechanism configured to be insensitive to the transmitted UWB RF signal;

wherein the received UWB RF signal relative to the thermal compensation reference signal varies with motion of the object.

2. The ultra-wideband (UWB) transceiver of claim 1 wherein the generator mechanism further comprises a pulse repetition frequency (PRF) generator module and an impulse generator module which generate a transmitted pulse signal for enabling the port mechanism to switch between the transmit and receive modes.

3. The ultra-wideband (UWB) transceiver of claim 2 further comprising a diode detector module for averaging energy in the received signal over a defined period of time.

4. The ultra-wideband (UWB) transceiver of claim 3 further comprising a thermal compensation module for generating the thermal compensation reference signal based upon variations in direct current (DC) supply voltage from ambient temperature fluctuations.

5. The ultra-wideband (UWB) transceiver of claim 4 further comprising a differential amplifier module for comparing the received UWB RF signal to the thermal compensation reference signal and for amplifying a difference between the received UWB RF signal and the thermal compensation reference signal to generate a differential signal having a high frequency component.

6. The ultra-wideband (UWB) transceiver of claim 5 further comprising a baseband filter module for receiving the differential signal from the differential amplifier and removing high frequency noise components for generating an output signal.

7. The ultra-wideband (UWB) transceiver of claim 1 wherein the short duration pulses are less than a nano-second in width.

8. The ultra-wideband (UWB) transceiver of claim 7 wherein the short duration pulses created by the PRF generator are of a frequency between 1 and 30 MHz.

9. The ultra-wideband (UWB) transceiver of claim 1 further comprising a transmit/receive medium connected to the port mechanism, the medium being selected from the group consisting of an antenna, coaxial cable and twisted pair.

10. The ultra-wideband (UWB) transceiver of claim 2 wherein the transmitted pulse signal comprises a pulse stream alternating between a lower signal potential and a higher signal potential, and the port mechanism operates in the transmit mode during assertion of the lower signal potential and in the receive mode during assertion of the higher signal potential.

11. The ultra-wideband (UWB) transceiver of claim 10 wherein an input to the detector mechanism is continuously coupled to an output of the impulse generator module to receive the transmitted pulse signal, and the detector mechanism is impeded from conducting a signal when a potential difference between the input to the detector mechanism and an output of the detector mechanism is below a threshold potential.

12. The ultra-wideband (UWB) transceiver of claim 11 wherein the potential difference between the output of the detector mechanism and the input to the detector mechanism is reduced to a value below the threshold potential when the input to the detector mechanism is at the lower signal potential.

13. The ultra-wideband (UWB) transceiver of claim 12 wherein the detector mechanism comprises a first diode for detecting the received UWB RE signal, the first diode coupled to the output of the impulse generator module and reverse biased when an anode of the first diode is at the lower signal potential.

14. The ultra-wideband (UWB) transceiver of claim 13 wherein the threshold potential is above a ground potential and the lower signal potential is at the ground potential.

15. The ultra-wideband (UWB) transceiver of claim 13 wherein the detector mechanism comprises:

a. a second diode connected in parallel with the first diode for detecting the thermal compensation reference signal, the second diode continuously coupled to the port mechanism and the output of the impulse generator module; and b. circuitry coupled between the impulse generator module and the second diode for filtering the transmitted pulse signal from a signal received at an anode of the second diode.

* * * * *